(12) United States Patent
Bolotin et al.

(10) Patent No.: US 11,894,891 B2
(45) Date of Patent: Feb. 6, 2024

(54) SIGNALING FOR SCHEDULED MULTI-USER MULTIPLE-INPUT MULTIPLE-OUTPUT ACKNOWLEDGEMENT

(71) Applicant: Intel Corporation, Santa Clara, CA (US)

(72) Inventors: Ilya Bolotin, Nizhny Novgorod (RU); Oren Kedem, Modiin Maccabim-Reut (IL); Artyom Lomayev, Nizhny Novgorod (RU); Alexander Maltsev, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/033,454

(22) Filed: Sep. 25, 2020

(65) Prior Publication Data
US 2021/0013935 A1 Jan. 14, 2021

Related U.S. Application Data

(63) Continuation of application No. 16/168,697, filed on Oct. 23, 2018, now abandoned.

(60) Provisional application No. 62/576,474, filed on Oct. 24, 2017.

(51) Int. Cl.
| | | |
|---|---|---|
| H04B 7/0452 | (2017.01) |
| H04L 5/00 | (2006.01) |
| H04B 7/06 | (2006.01) |
| H04L 1/18 | (2023.01) |

(52) U.S. Cl.
CPC ......... *H04B 7/0452* (2013.01); *H04B 7/0617* (2013.01); *H04L 1/18* (2013.01); *H04L 5/0005* (2013.01)

(58) Field of Classification Search
None
See application file for complete search history.

(56) References Cited

U.S. PATENT DOCUMENTS

| | | | |
|---|---|---|---|
| 2006/0034274 A1* | 2/2006 | Kakani | H04L 1/0079 370/389 |
| 2006/0285526 A1* | 12/2006 | Jang | H04W 52/0216 370/338 |
| 2007/0147284 A1* | 6/2007 | Sammour | H04W 72/14 370/328 |
| 2011/0096710 A1* | 4/2011 | Liu | H04L 1/1628 370/312 |
| 2011/0149882 A1* | 6/2011 | Gong | H04L 1/1685 370/329 |

(Continued)

*Primary Examiner* — Alpus Hsu
*Assistant Examiner* — Camquyen Thai
(74) *Attorney, Agent, or Firm* — Eversheds Sutherland (US) LLP

(57) ABSTRACT

This disclosure describes systems, methods, and devices related to scheduled multi-user multiple-input multiple-output (MU-MIMO) acknowledgement. A device may determine a block acknowledgment schedule associated with one or more destination devices. The device may cause to send a multi-user multiple-input multiple-output (MU-MIMO) frame including the block acknowledgment schedule. The device may identify one or more acknowledgment frames received from at least one of the one or more destination devices based on the block acknowledgment schedule.

14 Claims, 8 Drawing Sheets

(56) References Cited

U.S. PATENT DOCUMENTS

| | | | |
|---|---|---|---|
| 2011/0225440 A1* | 9/2011 | Kwon | H04W 52/0225 |
| | | | 713/323 |
| 2013/0142127 A1* | 6/2013 | Morioka | H04L 1/1887 |
| | | | 370/328 |
| 2015/0124689 A1* | 5/2015 | Merlin | H04L 1/009 |
| | | | 370/312 |
| 2016/0285608 A1* | 9/2016 | Kwon | H04L 1/18 |
| 2017/0280421 A1* | 9/2017 | Ramamurthy | H04L 1/1685 |
| 2017/0289843 A1* | 10/2017 | Kim | H04W 28/06 |
| 2020/0162135 A1* | 5/2020 | Sun | H04W 80/08 |

\* cited by examiner

SIGNALING FOR SCHEDULED MULTI-USER MULTIPLE-INPUT MULTIPLE-OUTPUT ACKNOWLEDGEMENT

CROSS-REFERENCE TO RELATED APPLICATIONS

This application is a continuation of U.S. Non-provisional application Ser. No. 16/168,697, filed Oct. 23, 2018, which claims the benefit of U.S. Provisional Application No. 62/576,474, filed Oct. 24, 2017, the disclosures of which are incorporated herein by reference as if set forth in full.

TECHNICAL FIELD

This disclosure generally relates to systems and methods for wireless communications and, more particularly, to signaling for scheduled multi-user multiple-input multiple-output (MU-MIMO) acknowledgement.

BACKGROUND

Wireless devices are becoming widely prevalent and are increasingly requesting access to wireless channels. The growing density of wireless deployments require increased network and spectrum availability. Wireless devices may communicate with each other using directional transmission techniques, including but not limited to beamforming techniques. Wireless devices may communicate over a next generation 60 GHz (NG60) network, an enhanced directional multi-gigabit (EDMG) network, and/or any other network.

DETAILED DESCRIPTION

Figure 1:
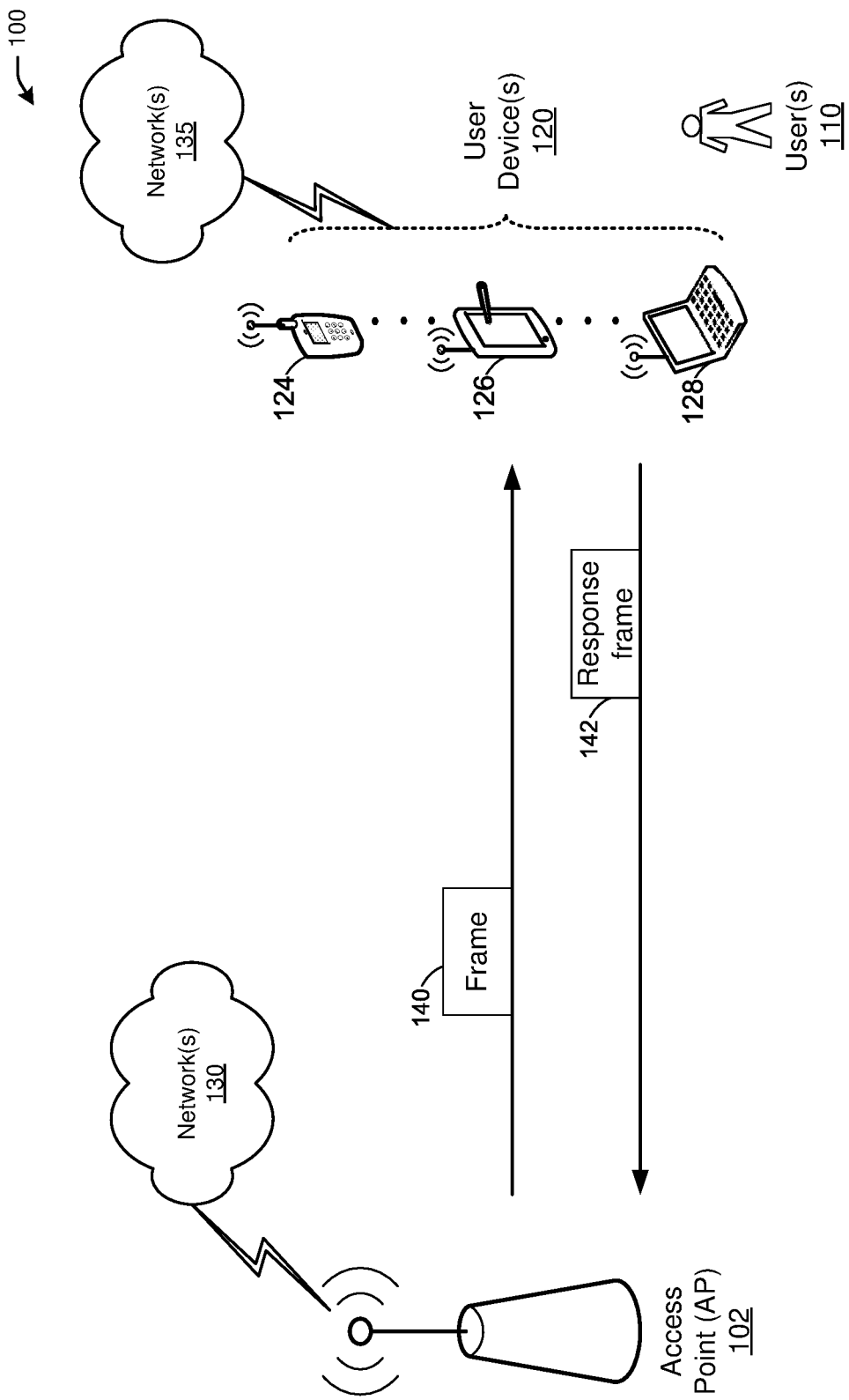
FIG. 1 depicts a network diagram illustrating an example network environment for signaling for scheduled multi-user multiple-input multiple-output (MU-MIMO) acknowledgement, in accordance with one or more example embodiments of the present disclosure.

Example embodiments described herein provide certain systems, methods, and devices for scheduled MU-MIMO acknowledgement signaling. The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Devices may communicate over a next generation 60 GHz (NG60) network, an enhanced directional multi-gigabit (EDMG) network, and/or any other network. Devices operating in EDMG may be referred to herein as EDMG devices. This may include user devices, and/or APs or other devices capable of communicating in accordance to a communication standard.

IEEE 802.11ay task group is currently developing the new standard in the mmWave (60 GHz) band which is an evolution of the IEEE 802.11ad standard also known as WiGig. PHY layer of IEEE 802.11ay can suggest multi-gigabit throughput which is achieved with help of large bandwidth and the use of MU-MIMO. Theoretically, MU-MIMO with 8 streams may increase access point (AP) throughput in 8 times, but practically this throughput is significantly reduced by large medium access control (MAC) overhead which is caused by existing acknowledgement flow, where after transmitting MU-MIMO frame AP polls each station device (STA) for Block Acknowledgement (BA). To reduce this overhead the MU-MIMO acknowledgement flow which considers that STAs transmit their acknowledgements in scheduled periods. An open question is how to deliver the scheduling information from AP to STAs.

Previously MU-MIMO acknowledgement was based on polling, which means that STA transmitted its BA only after request from AP. Such flow considers no scheduling for BA transmission, so the signaling from AP was not required. The legacy polling-based acknowledgement flow causes large overhead increasing the duration of one MU cycle and therefore significantly reducing throughput.

Example embodiments of the present disclosure relate to systems, methods, and devices for scheduled MU-MIMO acknowledgement signaling.

A directional multi-gigabyte (DMG) communications may involve one or more directional links to communicate at a rate of multiple gigabits per second, for example, at least 1 gigabit per second, 7 gigabits per second, or any other rate. An amendment to a DMG operation in a 60 GHz band, e.g., according to an IEEE 802.11ad standard, may be defined, for example, by an IEEE 802.11ay project.

In some demonstrative embodiments, one or more devices may be configured to communicate over a next generation 60 GHz (NG60) network, an enhanced DMG (EDMG) network, and/or any other network. For example, the one or more devices may be configured to communicate over the NG60 or EDMG networks.

In one or more embodiments, a scheduled MU-MIMO acknowledgement signaling system may introduce a scheduling procedure for MU-MIMO when MU-MIMO station devices (STAs) within an MU-MIMO group respond to a personal basic service set (PBSS) control point (PCP)/access point (AP). The PCP/AP may transmit an MU physical layer (PHY) protocol data unit (PPDU) to the STAs.

In one or more embodiments, a scheduled MU-MIMO acknowledgement signaling system may facilitate signaling for scheduled MU-MIMO acknowledgement. For example, the scheduled MU-MIMO acknowledgement signaling system may facilitate a mechanism for how MU-MIMO BA scheduling information can be delivered from PCP/AP to STAs.

In one or more embodiments, a scheduled MU-MIMO acknowledgment signaling system may facilitate that a PCP/AP may transmit scheduling information within a frame address to one or more STAs with a day MU-MIMO group. For example, a frame may be an MU-PPDU or an MU-MPDU or any other frame that is a MIMO frame sent to one or more STAs.

In one or more embodiments, a scheduled MU-MIMO acknowledgment signaling system may facilitate that each of the STAs that receive the frame sent from the PCP/AP (e.g., MU-PPDU, etc.) may process the frame by decoding it and extracting information associated with how and when to respond to the PCP/AP. This is different than prior solutions where an STA had to receive a request for acknowledgment from the PCP/AP.

In one or more embodiments, a scheduled MU-MIMO acknowledgment signaling system may facilitate that the STA will use the extracted information to determine a schedule that may be embedded or otherwise included in the received frame.

In one or more embodiments, the frame sent by the PCP/AP (and received by the STA) may be an aggregation of multiple frames that were destined to that STA. For example, an aggregated MPDU may be destined to the STA. The aggregated MPDU may include one or more control frames or portions of the aggregated MPDU that comprise scheduling information. The control frames or portions comprising the scheduling information may be repeated within the aggregated MPDU in order to minimize the situations where the control frame is not received or is lost before it has been received by the STA. Since the STA relies on the scheduling information in order to respond to the PCP/AP at a certain schedule, it is important to increase the chances that the STA will receive the scheduling information comprised in the aggregated MPDU. The number of how many times to repeat the control frame within the aggregated MPDU may be dependent on implementation. Further, the location of where the control frames are within the aggregated MPDU may also be dependent on implementation. For example, a control frame with the scheduling information may be sent at the beginning of the aggregated MPDU and at the end of the aggregated MPDU or it can be sent at every other portion of the aggregated MPDU. Although these examples are given for illustration purposes, other patterns for repeating the control frame with the scheduling information, when the control frame is part of the aggregated MPDU.

In one or more embodiments, a scheduled MU-MIMO acknowledgment signaling system may facilitate that the control frame with the scheduling information may be comprised of one or more fields that may help the STA receiving the control frame within the aggregated MPDU to determine how and when to transmit its acknowledgment to the PCP/AP. For example, the control frame may comprise a first offset and a second offset. Where the first offset may indicate to the STA the time offset that it may use after receiving the aggregated MPDU in order to send its acknowledgment. The second offset may be associated with an indication of when the PCP/AP will be sending a subsequent aggregated MPDU that may be destined to the STA.

The embodiments introduced by the scheduled MU-MIMO acknowledgement signaling system may make it possible to use scheduled MU-MIMO acknowledgement flow which can provide up to 758% throughput gain compared to the legacy flow.

The above descriptions are for purposes of illustration and are not meant to be limiting. Numerous other examples, configurations, processes, etc., may exist, some of which are described in greater detail below. Example embodiments will now be described with reference to the accompanying figures.

FIG. 1 is a network diagram illustrating an example network environment for scheduled MU-MIMO acknowledgement signaling, in accordance with one or more example embodiments of the present disclosure. Wireless network 100 may include one or more user device(s) 120 and one or more access point(s) (AP) 102, which may communicate in accordance with IEEE 802.11 communication standards, such as the IEEE 802.11ad and/or IEEE 802.11ay specifications. The user device(s) 120 may be referred to as stations (STAs). The user device(s) 120 may be mobile devices that are non-stationary and do not have fixed locations. Although the AP 102 is shown to be communicating on multiple antennas with user devices 120, it should be understood that this is only for illustrative purposes and that any user device 120 may also communicate using multiple antennas with other user devices 120 and/or AP 102.

In some embodiments, the user device(s) 120 and the AP 102 may include one or more computer systems similar to that of the functional diagram of FIG. 8 and/or the example machine/system of FIG. 9.

One or more illustrative user device(s) 120 and/or AP 102 may be operable by one or more user(s) 110. The user device(s) 120 (e.g., 124, 126, or 128) and/or AP 102 may include any suitable processor-driven device including, but not limited to, a mobile device or a non-mobile, e.g., a static, device. For example, user device(s) 120 and/or AP 102 may include, a user equipment (UE), a station (STA), an access point (AP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. It is understood that the above is a list of devices. However, other devices, including smart devices, Internet of Things (IoT), such as lamps, climate control, car components, household components, appliances, etc. may also be included in this list.

Any of the user device(s) 120 (e.g., user devices 124, 126, 128), and AP 102 may be configured to communicate with each other via one or more communications networks 130 and/or 135 wirelessly or wired. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128), and AP 102 may include one or more communications antennas. The one or more communications antennas may be any suitable type of antennas corresponding to the communications protocols used by the user device(s) 120 (e.g., user devices 124, 126 and 128), and AP 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, or the like. The one or more communications antennas may be communicatively coupled to a radio component to transmit and/or receive signals, such as communications signals to and/or from the user devices 120 and/or AP 102.

Any of the user devices 120 (e.g., user devices 124, 126, 128), and AP 102 may include multiple antennas that may include one or more directional antennas. The one or more directional antennas may be steered to a plurality of beam directions. For example, at least one antenna of a user device 120 (or an AP 102) may be steered to a plurality of beam directions. For example, a user device 120 (or an AP 102) may transmit a directional transmission to another user device 120 (or another AP 102).

Any of the user device(s) 120 (e.g., user devices 124, 126, 128), and AP 102 may be configured to perform directional transmission and/or directional reception in conjunction with wirelessly communicating in a wireless network. Any of the user device(s) 120 (e.g., user devices 124, 126, 128), and AP 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128), and AP 102 may be configured to perform any given directional transmission towards one or more defined transmit sectors. Any of the user device(s) 120 (e.g., user devices 124, 126, 128), and AP 102 may be configured to perform any given directional reception from one or more defined receive sectors.

MIMO beamforming in a wireless network may be accomplished using RF beamforming and/or digital beamforming. In some embodiments, in performing a given MIMO transmission, user devices 120 and/or AP 102 may be configured to use all or a subset of its one or more communications antennas to perform MIMO beamforming.

Any of the user devices 120 (e.g., user devices 124, 126, 128), and AP 102 may include any suitable radio and/or transceiver for transmitting and/or receiving radio frequency (RF) signals in the bandwidth and/or channels corresponding to the communications protocols utilized by any of the user device(s) 120 and AP 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g., 802.11b, 802.11g, 802.11n, 802.11ax), 5 GHz channels (e.g., 802.11n, 802.11ac, 802.11ax), or 60 GHZ channels (e.g., 802.11ad, 802.11ay). In some embodiments, non-Wi-Fi protocols may be used for communications between devices, such as Bluetooth, dedicated short-range communication (DSRC), Ultra-High Frequency (UHF) (e.g., IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

Some demonstrative embodiments may be used in conjunction with a wireless communication network communicating over a frequency band of 60 GHz. However, other embodiments may be implemented utilizing any other suitable wireless communication frequency bands, for example, an extremely high frequency (EHF) band (the millimeter wave (mmWave) frequency band), a frequency band within the frequency band of between 20 GHz and 300 GHz, a WLAN frequency band, a WPAN frequency band, a frequency band according to the WGA specification, and the like.

The phrases "directional multi-gigabit (DMG)" and "directional band (DBand)", as used herein, may relate to a frequency band wherein the channel starting frequency is above 45 GHz. In one example, DMG communications may involve one or more directional links to communicate at a rate of multiple gigabits per second, for example, at least 1 gigabit per second, 7 gigabits per second, or any other rate.

In some demonstrative embodiments, the user device(s) 120 and/or the AP 102 may be configured to operate in accordance with one or more specifications, including one or more IEEE 802.11 specifications, (e.g., an IEEE 802.11ad specification, an IEEE 802.11ay specification, and/or any other specification and/or protocol). For example, an amendment to a DMG operation in the 60 GHz band, according to an IEEE 802.11ad standard, may be defined, for example, by an IEEE 802.11ay project.

It is understood that a basic service set (BSS) provides the basic building block of an 802.11 wireless LAN. For example, in infrastructure mode, a single access point (AP) together with all associated stations (STAs) is called a BSS.

In one embodiment, and with reference to FIG. 1, when an AP (e.g., AP 102) establishes communication with one or more user devices 120 (e.g., user devices 124, 126, and/or 128), the AP 102 may communicate in a downlink direction and the user devices 120 may communicate with the AP 102 in an uplink direction by sending frames (e.g., frame 140) in either direction. A device (e.g., user devices 120 and/or AP 102) may respond to receiving a frame by sending a response frame 142. The user devices 120 may also communicate peer-to-peer or directly with each other with or without the AP 102. The data frames may be preceded by one or more preambles that may be part of one or more headers. These preambles may be used to allow a device (e.g., AP 102 and/or user devices 120) to detect a new incoming data frame from another device. A preamble may be a signal used in network communications to synchronize transmission timing between two or more devices (e.g., between the APs and user devices.

Figure 2:
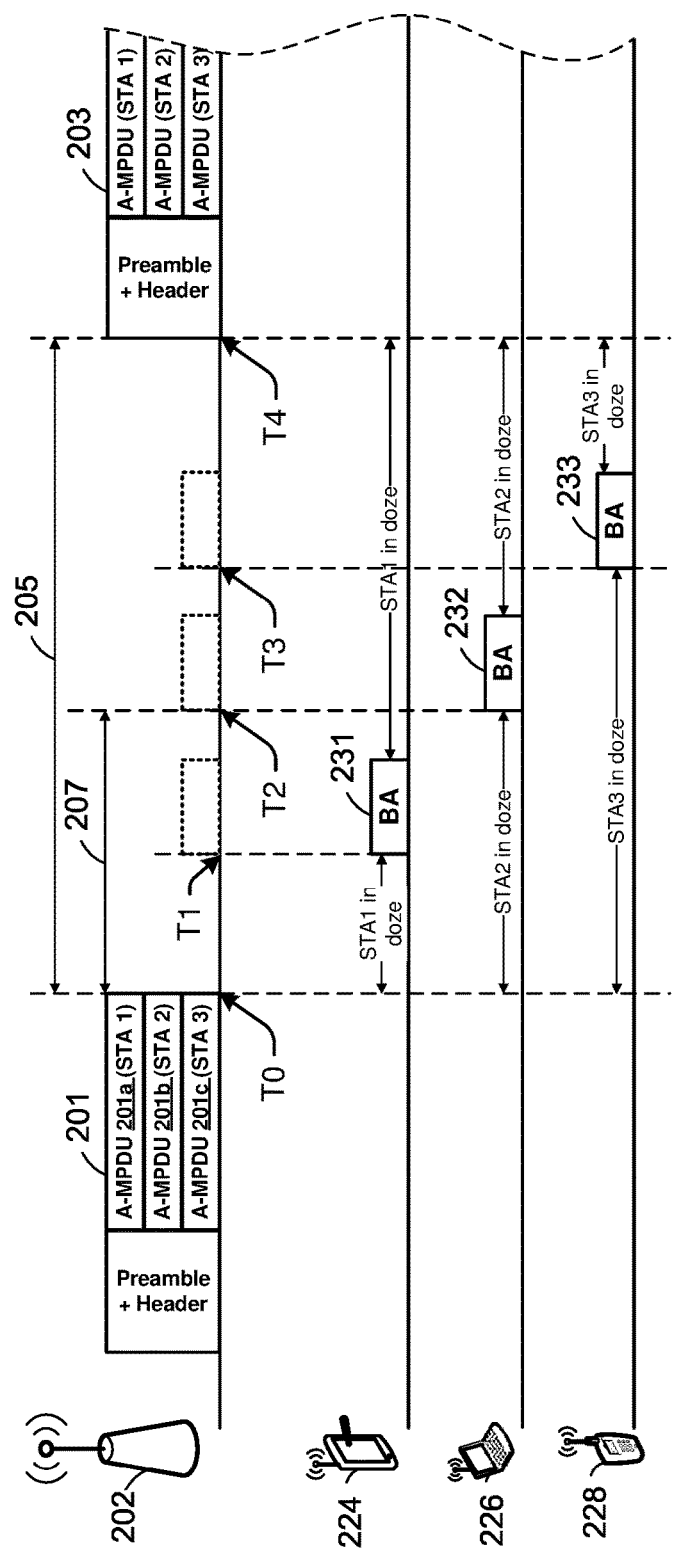
FIG. 2 depicts an illustrative schematic diagram for scheduled MU-MIMO acknowledgement and power save, in accordance with one or more example embodiments of the present disclosure.

FIG. 2 depicts an illustrative schematic diagram 200 for scheduled MU-MIMO acknowledgement and power save, in accordance with one or more example embodiments of the present disclosure.

Referring to FIG. 2, there is shown in PCP/AP 202 communicating with three STAs (e.g., user device 224 (STA1), user device 226 (STA2), user device 228 (STA3)). The PCP/AP 202 may send a frame (e.g., MU-PPDU 201). The MU-PPDU 201 may be composed of a preamble, a header, and one or more Aggregated MAC protocol data unit (A-MPDU), where each A-MPDU is a grouping of MPDUs that are destined for a specific STA. For example, A-MPDU 201a may be destined to STA1, A-MPDU 201b may be destined to STA2, and A-MPDU 201c may be destined to STA3.

In one or more embodiments, BAR frames may be removed from an acknowledgment flow in order to reduce overhead. STAs may transmit their BA during time slots scheduled by a personal basic service set control point (PCP) AP (PCP/AP) for each STA. For example, the PCP/AP 202 may send the MU-PPDU 201 without having to rely on sending BAR frames to induce the STAs, belonging to the MU-MIMO group, to send their acknowledgments. Instead, the PCP/AP 202 may facilitate sending information associated with each STA's acknowledgment and related timing.

In one or more embodiments, a PCP/AP (e.g., PCP/AP 202) may schedule time slots for a BA transmission for each STA considering knowledge about the BA type for each STA and that BAs may be transmitted with the lowest modulation and coding scheme (MCS). A PCP/AP may inform each STA of the STA's respective BA Transmission Time (BATT) by including scheduling information into the same MU PPDU. That is the PCP/AP 202 may include scheduling information in the portion of the MU-PPDU that is intended for a specific STA (e.g., STA1, STA2, STA3). For example, A-MPDU 201a may include scheduling information for STA1, A-MPDU 201b may include scheduling information for STA2, A-MPDU 201c may include scheduling information for STA3.

In one or more embodiments, additional information may be included in the MU-PPDU 201 to indicate to the STAs timing associated with a next MU-PPDU (e.g., MU-PPDU 203) that may be sent by the PCP/AP 202. In the example of FIG. 2, the MU-PPDU 201 may include information associated with time T1, T2, T3, and T4, where T1 is a time offset for STA1 to send its acknowledgment (e.g., BA 231), T2 is a time offset for STA2 to send its acknowledgment (e.g., BA 232), T3 is a time offset for STA3 to send its acknowledgment (e.g., BA 233), and T4 is a time offset for the PCP/AP 202 to send a next MU-PPDU 203.

In one or more embodiments, each STA may implement a power save mode after receiving an MU PPDU (e.g., an "end of frame" detection may be used for earlier receiver stop). The STA may wake up for BA transmission, and may return to a power save mode again until the time defined by AP (e.g., until the next MU PPDU transmission). The STA may follow the scheduling information and may wake up exactly for the STA's BA transmission (e.g., BAs 231, 232, 233) and MU PPDU reception, thereby performing power save in an effective and accurate way. For example, PCP/AP 202 may indicate to STA2 in A-MPDU 201b an offset value that indicates to the STA2 at which moment (e.g., T2) it should start transmitting its block acknowledgment frame (e.g., BA 232). Similarly, the PCP/AP 202 may indicate to STA1 in A-MPDU 201a an offset value that indicates to the STA1 at which moment (e.g., T1) it should start transmitting its block acknowledgment frame (e.g., BA 231). Further, the PCP/AP 202 may indicate to STA3 in A-MPDU 201c an offset value that indicates to the STA3 at which moment (e.g., T3) it should start transmitting its block acknowledgment frame (e.g., BA 233). This way, the three STAs may be in doze state (low power state) from the time the STAs received the MU-PPDU 201 (e.g., at time T0) until its respective offset value. Then after the STA sends its BA frame, the STA can go back to a low power state until the next MU-PPDU (e.g., MU-PPDU 203) is sent at time T4.

In one or more embodiments, scheduling information delivered from an AP to an STA may be specific to an STA, and may include a BATT Start offset (e.g., time offsets T1, T2, T3), which may indicate a beginning of time slot provided by the PCP/AP 202 for an STA to transmit the STA's BA.

In one or more embodiments, scheduling information delivered from an AP to an STA may be specific to an STA, and may include a next PPDU Start offset (e.g., T4), which may indicate the moment when an STA should begin listening to/for the PCP/AP 202. At this moment, the PCP/AP 202 may either start transmitting the next MU PPDU in a current sequence of an MU-MIMO transmission or may transmit a BAR to an STA if a solicited BA was not received.

In one embodiment, a new MU-MIMO acknowledgement flow considers that STAs which are the recipients of the MU-MIMO frame may transmit their BA frames during certain periods which were scheduled and communicated to STAs by AP. An example of such scheduled MU-MIMO acknowledgement flow is demonstrated in FIG. 2.

Scheduling information delivered from AP to STAs is STA specific and should include at least two values:

BATT Start offset which indicates the beginning of time slot provided by AP for STA to transmit its BA (BATT—BA Transmission Time); and Next A physical layer convergence protocol (PLCP) data unit (PPDU) Start offset which indicates the moment when STA should begin listening AP. At this moment AP may either start transmitting the next MU PPDU in current sequence of MU-MIMO transmission or transmit BAR to STA in case if solicited BA was not received.

MU-MIMO BA scheduling information can be delivered from AP to STAs by sending a control frame.

In one embodiment, in the PHY header method, the STA specific scheduling information BATT Start offset could be transmitted in Header-B which is unique for each stream in MU-MIMO while the common for all STAs in MU group Next PPDU Start offset could also be transmitted in Header-A which is common for all STAs in MU group. Such a solution is the most robust one. However, now both headers have not enough reserved bits, which could be used for our purpose. The extension of the headers would cause additional overhead and will add complexity to the PHY frame. It is understood that the above descriptions are for purposes of illustration and are not meant to be limiting.

Figure 3:
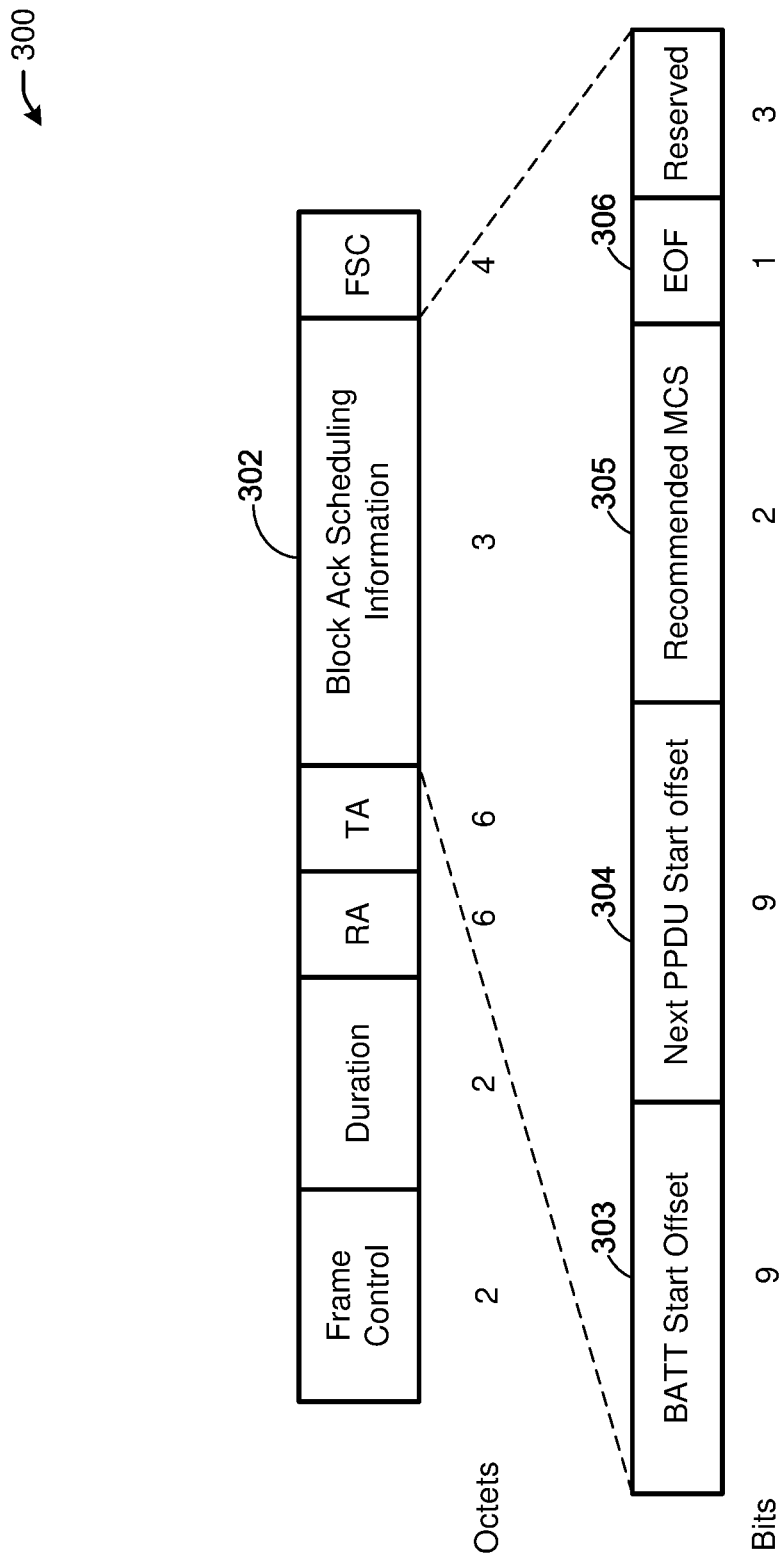
FIG. 3 depicts an illustrative schematic diagram for Block Acknowledgment (BA) Schedule frame format, in accordance with one or more example embodiments of the present disclosure.

FIG. 3 depicts an illustrative schematic diagram for block acknowledgment (BA) schedule frame 300 format, in accordance with one or more example embodiments of the present disclosure.

Referring to FIG. 3, there is shown that the BA schedule frame 300 comprises one or more fields. For example, the BA schedule frame 300 may include a BA scheduling information field 302. The BA scheduling information field 302 may be comprised of one or more subfields. The subfields may include a block acknowledgment transmission time (BATT) start offset subfield 303, a next PPDU start offset subfield 304, a recommended MCS subfield 305, and other fields (e.g., an end-of-frame (EOF) flag 306, and/or a reserved subfield).

In one embodiment, a scheduled MU-MIMO acknowledgement signaling system may facilitate that the BA schedule frame 300 may be used for scheduled MU-MIMO acknowledgement. For example, the scheduled MU-MIMO acknowledgement signaling system may facilitate a mechanism for how MU-MIMO BA scheduling information can be delivered from AP to STAs.

In one embodiment, in this mechanism, special control frame (e.g., the BA schedule frame 300) containing scheduling information may be included into the A-MPDU for the corresponding STA. By defining this new frame, the system is not limited in number of bits—scheduling may be provided with a good time resolution. An example of format of such frame is shown in FIG. 3. In FIG. 3, the BATT Start Offset subfield 303 and the Next PPDU Start offset subfield 304 may indicate the corresponding values (defined previously) in microseconds. The frame may also include the Recommended MCS subfield 305 which indicates the minimal MCS which can be used by STA for BA transmission. This may improve accuracy of scheduling. The end-of-frame (EOF) flag 306 indicates that the data part of aggregate MAC protocol data unit (A-MPDU) is over and after correct reception of this Control frame STA may stop receiving.

However, it is important that the information contained in the BA schedule frame 300 not get lost before it gets to the receiving device since this frame contains important scheduling information that the receiving device needs to follow. In one or more embodiments, if the frame is lost during the transmission of the aggregated frame (e.g., A-MPDU), the AP will need to retransmit the entire A-MPDU. The straightforward solution is repetition of the BA schedule frame 300 in different parts of the A-MPDU. For example, it can be repeated in the beginning and in the end of A-MPDU providing diversity in interference environment, or it can be repeated several times in the end of A-MPDU as a rough padding to align durations of A-MPDU for different MU-MIMO streams or it can be repeated several times within A-MPDU. Considering just one repetition and targeting 0.01 frame error rate there is only a 0.0001 probability that two Block ACK Schedule frames will not be received correctly.

In Table 1, the overhead of two Block ACK Schedule frames included in A-MPDUs with different amount of transmitted data is shown. The estimation was done under the assumption that AP transmits data to 8 STAs in MU-MIMO using MCS 12 (4620 Mbps) and all STAs send their BAs after each MU PPDU. It is understood that the above descriptions are for purposes of illustration and are not meant to be limiting.

TABLE 1

The scheduling signaling overhead for Option 2

| PSDU, bytes | Scheduling signaling overhead (comparing the duration of MU cycle), % |
|---|---|
| 64 | 0.188 |
| 256 | 0.186 |
| 1024 | 0.181 |
| 4096 | 0.16 |
| 16384 | 0.11 |
| 65536 | 0.05 |

Figure 4:
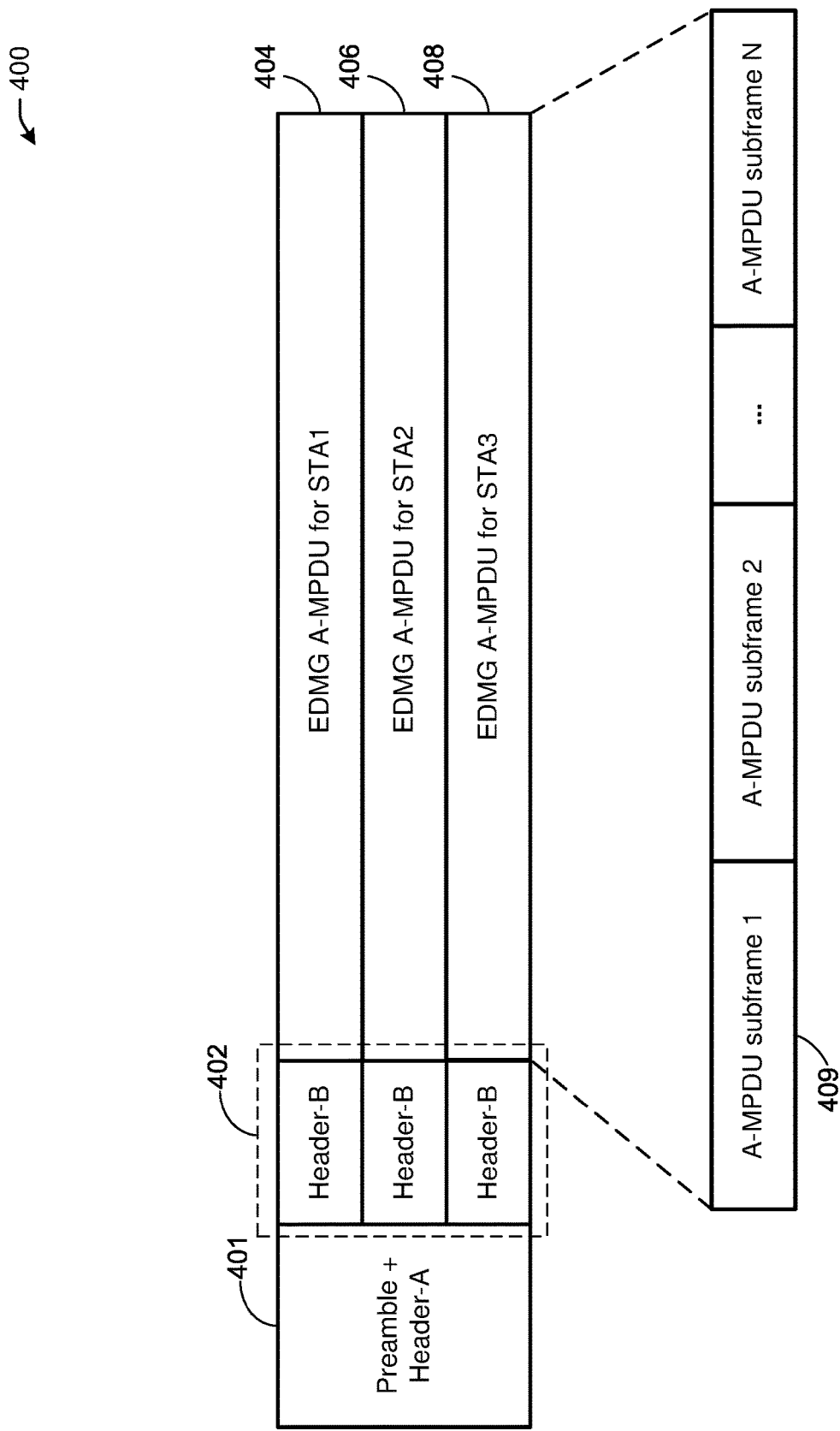
FIG. 4 depicts an illustrative schematic diagram for scheduled MU-MIMO acknowledgement signaling, in accordance with one or more example embodiments of the present disclosure.

FIG. 4 depicts an illustrative schematic diagram for scheduled MU-MIMO acknowledgement signaling, in accordance with one or more example embodiments of the present disclosure.

Referring to FIG. 4, there is shown an example of the scheduled MU-MIMO acknowledgement signaling setup frame system with the location of delivered Block ACK Scheduling information in an MU PPDU frame 400.

In one or more embodiments, a transmitting device (e.g., a PCP/AP) may need to send information to one or more STAs (e.g., STA1, STA2, and STA3) in an MU-MIMO group. The PCP/AP may allocate a specific schedule for the STAs to respond to the MU PPDU frame 400 that the PCP/AP may want to send to the STAs. The MU PPDU 400 may be comprised of one or more portions, for example, a preamble and a Header A portion 401, a Header B portion 402, and one or more EDMG A-MPDU portions (e.g., portion 404, 406, and 408) where each of these EDMG A-MPDU portions may be addressed to a specific STA in the MU-MIMO group. Each of these EDMG A-MPDU portions may be an aggregation of one or more sub-frames (e.g., an A-MPDU). In this example, the EDMG A-MPDU portion 408 for STA3 is shown to include 1 to N A-MPDU sub-frames 409, where N is a positive integer. At least one of these A-MPDU sub-frames may be a block acknowledgment (BA) scheduling sub-frame that includes Block ACK Scheduling information. This BA scheduling sub-frame may be repeated one or more time within the EDMG A-MPDU portion 408 in order to increase the chances that that information is received by the STA3, in this example. It should be understood that although only three STAs are shown in this MU-MIMO group, there may be more or less than three STAs in the MU-MIMO group. Also, although in this example, the EDMG A-MPDU of STA3 should comprise one or more A-MPDU sub-frames, the other STAs in the MU-MIMO group may also include similar information (not shown in FIG. 4).

It is understood that the above descriptions are for purposes of illustration and are not meant to be limiting.

Figure 5A:
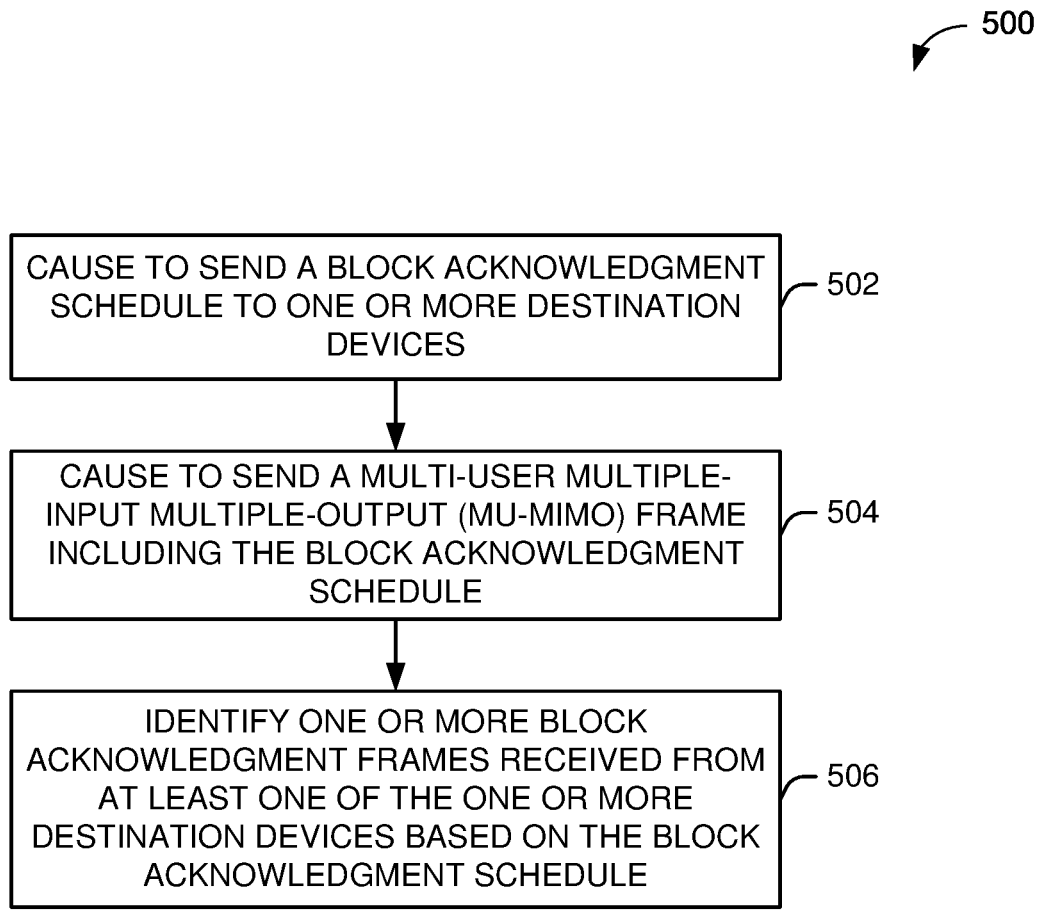
FIG. 5A illustrates a flow diagram of illustrative process for scheduled MU-MIMO acknowledgement signaling, in accordance with one or more example embodiments of the present disclosure.

FIG. 5A illustrates a flow diagram of illustrative process 500 for an illustrative scheduled MU-MIMO acknowledgement signaling setup frame system, in accordance with one or more example embodiments of the present disclosure.

At block 502, a device (e.g., the user device(s) 120 and/or the AP 102 of FIG. 1) may cause to send a block acknowledgment schedule to one or more destination devices.

At block 504, the device may cause to send a multi-user multiple-input multiple-output (MU-MIMO) frame including the block acknowledgment schedule. The MU-MIMO frame includes one or more EDMG A-MPDUs. For example, a first A-MPDU of the one or more EDMG A-MPDUs could be associated with a first destination device of the one or more destination devices. This first A-MPDU may include a first sub-frame that may include the block acknowledgment schedule. This first sub-frame may be repeated within the first A-MPDU. For example, the A-MPDU may include one or more control frames or portions of the A-MPDU that comprise scheduling information. The control frames or portions comprising the scheduling information may be repeated within the A-MPDU in order to minimize the situations where the control frame is not received or is lost before it has been received by the STA. Since the STA relies on the scheduling information in order to respond to the PCP/AP at a certain schedule, it is important to increase the chances that the STA will receive the scheduling information comprised in the A-MPDU. Number of how many times to repeat the control frame within the A-MPDU may be dependent on implementation. Also, the block acknowledgment schedule may include a block acknowledgment transmission time (BATT) offset. For example, the PCP/AP may inform each STA of the STA's respective BATT by including scheduling information into the same MU PPDU. That is the PCP/AP may include scheduling information in the portion of the MU-PPDU that is intended for a specific STA. This BATT offset indicates to a first destination device a time to send a first acknowledgment to the first A-MPDU. Also, the block acknowledgment schedule may include a next MU-MIMO frame time offset.

At block 506, the device may identify one or more acknowledgment frames received from at least one of the one or more destination devices based on the block acknowledgment schedule.

It is understood that the above descriptions are for purposes of illustration and are not meant to be limiting.

Figure 5B:
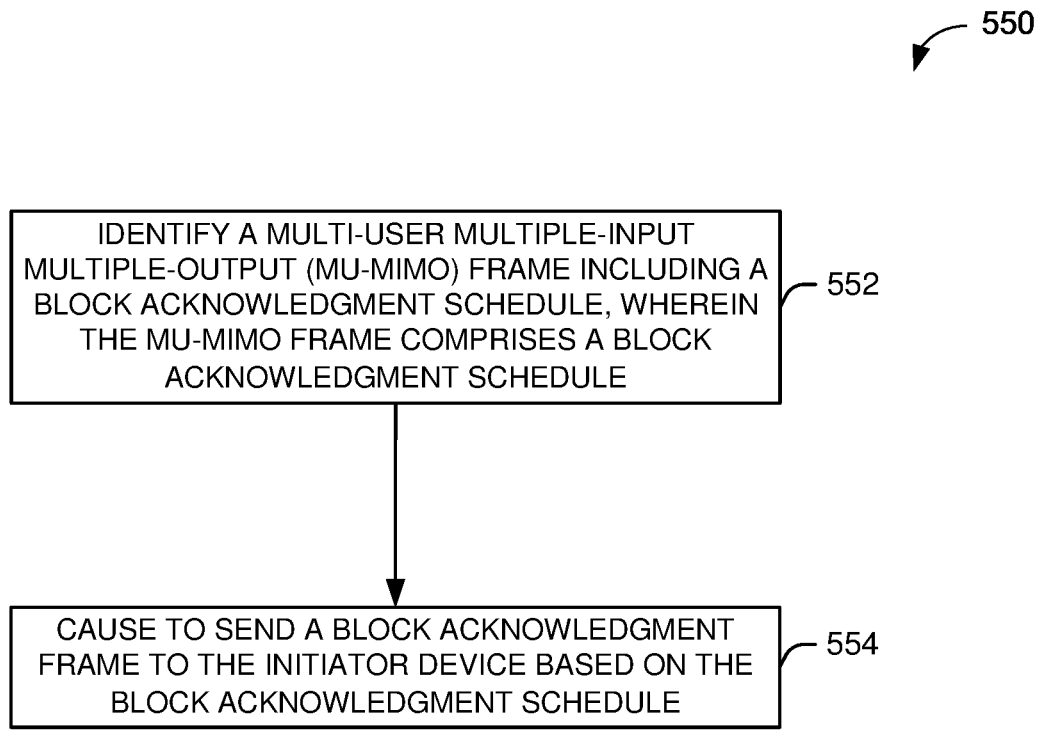
FIG. 5B illustrates a flow diagram of illustrative process for scheduled MU-MIMO acknowledgement signaling, in accordance with one or more example embodiments of the present disclosure.

FIG. 5B illustrates a flow diagram of illustrative process 550 for an illustrative scheduled MU-MIMO acknowledgement signaling system, in accordance with one or more example embodiments of the present disclosure.

At block 552, a device (e.g., the user device(s) 120 and/or the AP 102 of FIG. 1) may identify a multi-user multiple-input multiple-output (MU-MIMO) frame including a block acknowledgment schedule, wherein the MU-MIMO frame comprises a block acknowledgment schedule. This MU-MIMO frame may include one or more EDMG A-MPDUs and the MU-MIMO frame may also include a first A-MPDU associated with the responding device. This first A-MPDU may include a first sub-frame that may include the block acknowledgment schedule. This first sub-frame may be repeated within the first A-MPDU. For example, the A-MPDU may include one or more control frames or portions of the A-MPDU that comprise scheduling information. The control frames or portions comprising the scheduling information may be repeated within the A-MPDU in order to minimize the situations where the control frame is not received or is lost before it has been received by the STA. Since the STA relies on the scheduling information in order to respond to the PCP/AP at a certain schedule, it is important to increase the chances that the STA will receive the scheduling information comprised in the A-MPDU. Number of how many times to repeat the control frame within the A-MPDU may be dependent on implementation. Also, the block acknowledgment schedule may include a block acknowledgment transmission time (BATT) offset. For example, the PCP/AP may inform each STA of the STA's respective BATT by including scheduling information into the same MU PPDU. That is the PCP/AP may include scheduling information in the portion of the MU-PPDU that is intended for a specific STA. This BATT offset indicates to a first destination device a time to send a first acknowledgment to the first A-MPDU. Also, the block acknowledgment schedule may include a next MU-MIMO frame time offset.

At block 554, the device may cause to send a block acknowledgment frame to the initiator device based on the block acknowledgment schedule.

It is understood that the above descriptions are for purposes of illustration and are not meant to be limiting.

Figure 6:
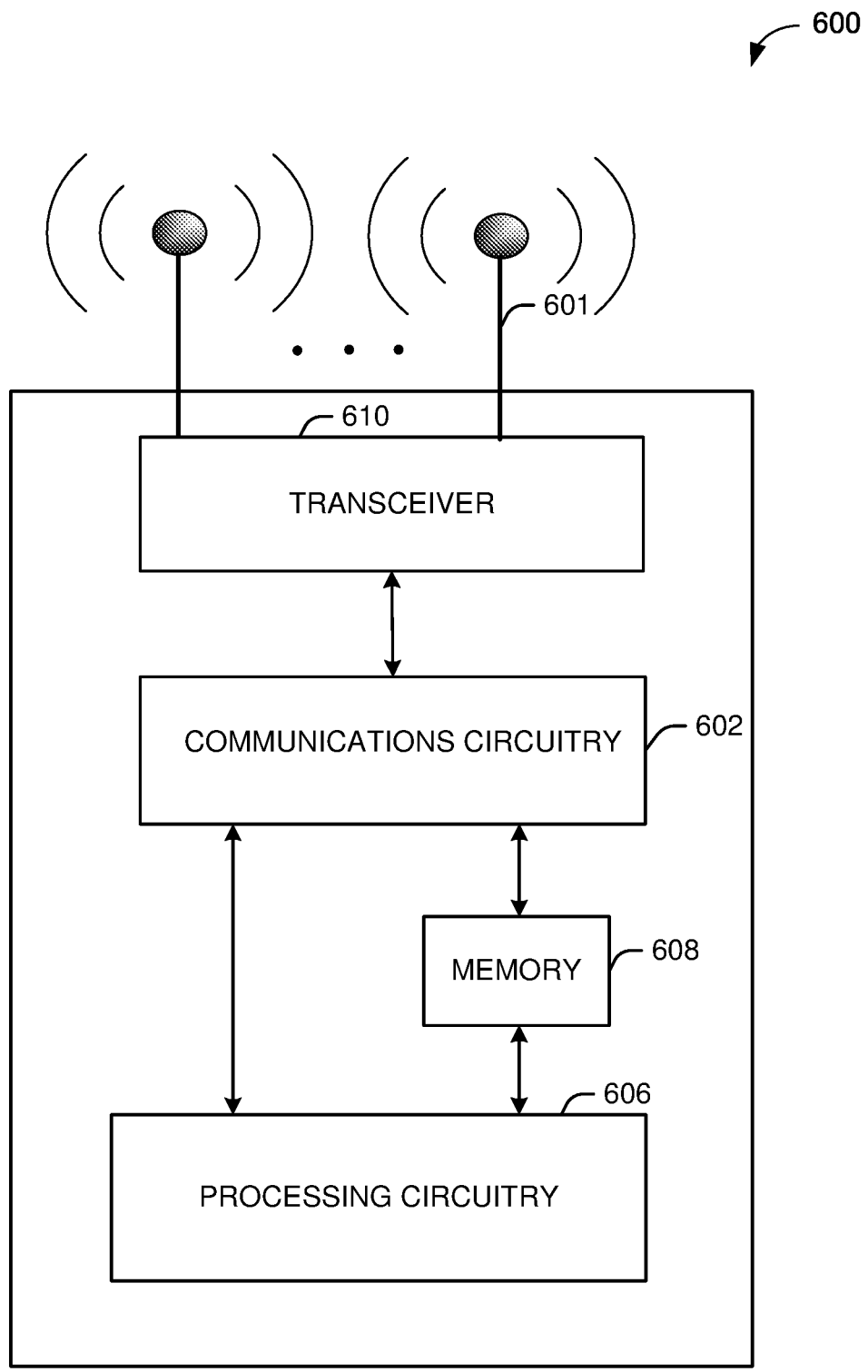
FIG. 6 illustrates a functional diagram of an example communication station that may be suitable for use as a user device, in accordance with one or more example embodiments of the present disclosure.

FIG. 6 shows a functional diagram of an exemplary communication station 600 in accordance with some embodiments. In one embodiment, FIG. 6 illustrates a functional block diagram of a communication station that may be suitable for use as an AP 102 (FIG. 1) or a user device 120 (FIG. 1) in accordance with some embodiments. The communication station 600 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 602 may include communications circuitry 602 and a transceiver 610 for transmitting and receiving signals to and from other communication stations using one or more antennas 601. The transceiver 610 may be a device comprising both a transmitter and a receiver that are combined and share common circuitry (e.g., communication circuitry 602). The communication circuitry 602 may include amplifiers, filters, mixers, analog to digital and/or digital to analog converters. The transceiver 610 may transmit and receive analog or digital signals. The transceiver 610 may allow reception of signals during transmission periods. This mode is known as full-duplex, and may require the transmitter and receiver to operate on different frequencies to minimize interference between the transmitted signal and the received signal. The transceiver 610 may operate in a half-duplex mode, where the transceiver 610 may transmit or receive signals in one direction at a time.

The communications circuitry 602 may include circuitry that can operate the physical layer (PHY) communications and/or medium access control (MAC) communications for controlling access to the wireless medium, and/or any other communications layers for transmitting and receiving signals. The communication station 600 may also include processing circuitry 606 and memory 608 arranged to perform the operations described herein. In some embodiments, the communications circuitry 602 and the processing circuitry 606 may be configured to perform operations detailed in FIGS. 1-5.

In accordance with some embodiments, the communications circuitry 602 may be arranged to contend for a wireless medium and configure frames or packets for communicating over the wireless medium. The communications circuitry 602 may be arranged to transmit and receive signals. The communications circuitry 602 may also include circuitry for modulation/demodulation, upconversion/downconversion, filtering, amplification, etc. In some embodiments, the processing circuitry 606 of the communication station 600 may include one or more processors. In other embodiments, two or more antennas 601 may be coupled to the communications circuitry 602 arranged for sending and receiving signals. The memory 608 may store information for configuring the processing circuitry 606 to perform operations for configuring and transmitting message frames and performing the various operations described herein. The memory 608 may include any type of memory, including non-transitory memory, for storing information in a form readable by a machine (e.g., a computer). For example, the memory 608 may include a computer-readable storage device, read-only memory (ROM), random-access memory (RAM), magnetic disk storage media, optical storage media, flash-memory devices and other storage devices and media.

In some embodiments, the communication station 600 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 600 may include one or more antennas 601. The antennas 601 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 600 may include one or more of a keyboard, a display, a non-volatile memory port, multiple antennas, a graphics processor, an application processor, speakers, and other mobile device elements. The display may be an LCD screen including a touch screen.

Although the communication station 600 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 600 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 600 may include one or more processors and may be configured with instructions stored on a computer-readable storage device memory.

Figure 7:
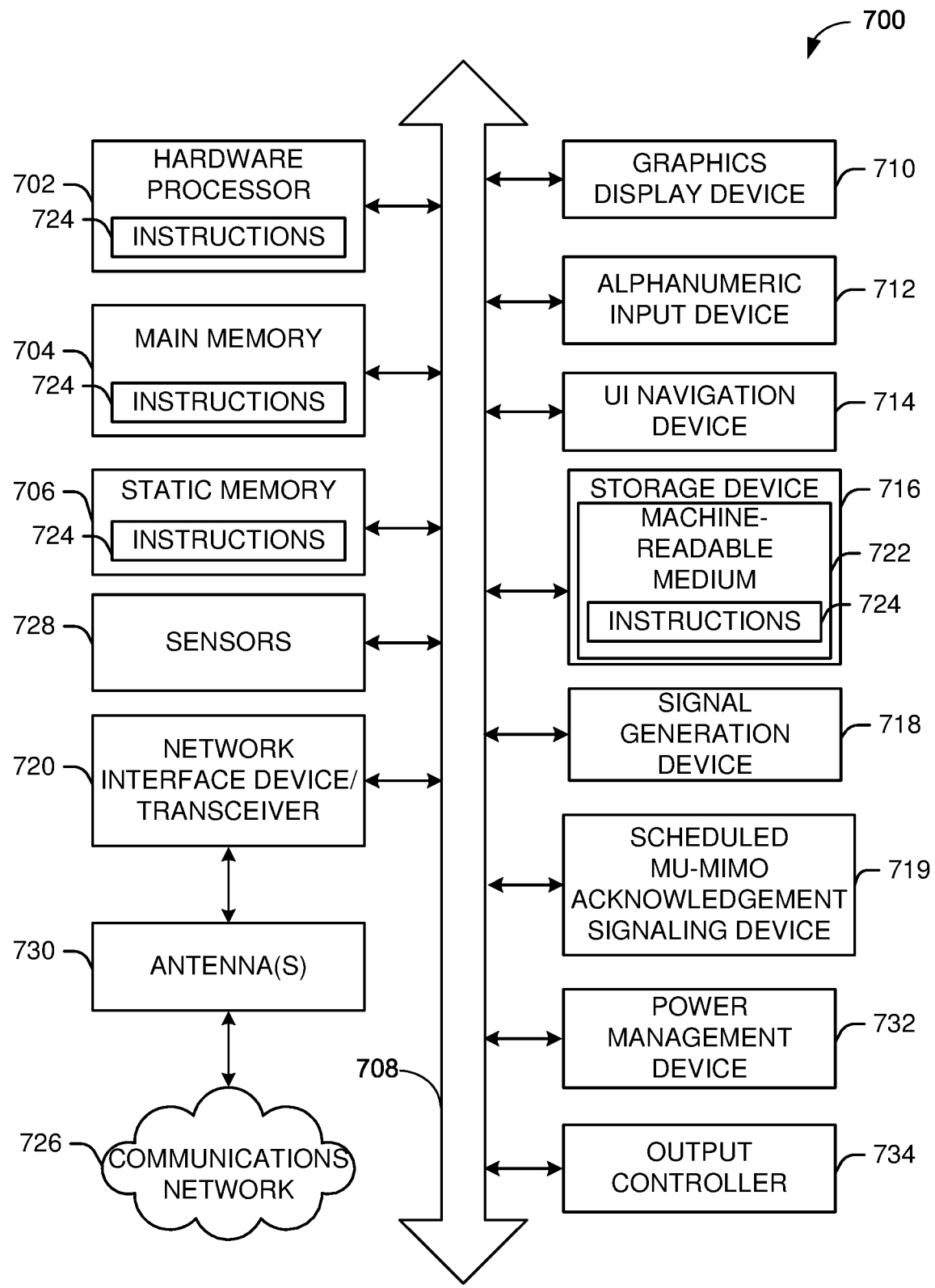
FIG. 7 illustrates a block diagram of an example machine upon which any of one or more techniques (e.g., methods) may be performed, in accordance with one or more example embodiments of the present disclosure.

FIG. 7 illustrates a block diagram of an example of a machine 700 or system upon which any one or more of the techniques (e.g., methodologies) discussed herein may be performed. In other embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environments. The machine 700 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The machine 700 may further include a power management device 732, a graphics display device 710, an alphanumeric input device 712 (e.g., a keyboard), and a user interface (UI) navigation device 714 (e.g., a mouse). In an example, the graphics display device 710, alphanumeric input device 712, and UI navigation device 714 may be a touch screen display.

The machine 700 may additionally include a storage device (i.e., drive unit) 716, a signal generation device 718 (e.g., a speaker), a scheduled MU-MIMO acknowledgement signaling device 719, a network interface device/transceiver 720 coupled to antenna(s) 730, and one or more sensors 728, such as a global positioning system (GPS) sensor, a compass, an accelerometer, or other sensor. The machine 700 may include an output controller 734, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within the static memory 706, or within the hardware processor 702 during execution thereof by the machine 700. In an example, one or any combination of the hardware processor 702, the main memory 704, the static memory 706, or the storage device 716 may constitute machine-readable media.

The scheduled MU-MIMO acknowledgement signaling device 719 may carry out or perform any of the operations and processes (e.g., processes 500 and 550) described and shown above. For example, the scheduled MU-MIMO acknowledgement signaling device 719 may be configured to introduce a scheduling procedure for MU-MIMO when MU-MIMO station devices (STAs) within an MU-MIMO group respond to a personal basic service set (PBSS) control point (PCP)/access point (AP). The PCP/AP may transmit an MU physical layer (PHY) protocol data unit (PPDU) to the STAs.

The scheduled MU-MIMO acknowledgement signaling device 719 may facilitate signaling for scheduled MU-MIMO acknowledgement. For example, the scheduled MU-MIMO acknowledgement signaling system may facilitate a mechanism for how MU-MIMO BA scheduling information can be delivered from PCP/AP to STAs.

The scheduled MU-MIMO acknowledgement signaling device 719 may facilitate that a PCP/AP may transmit scheduling information within a frame address two one or more STAs with a day MU-MIMO group. For example, a frame may be an MU-PPDU or an MU-MPDU or any other frame that is a MIMO frame sent to one or more STAs.

The scheduled MU-MIMO acknowledgement signaling device 719 may facilitate that each of the STAs that receive the frame sent from the PCP/AP (e.g., MU-PPDU, etc.) may process the frame by decoding it and extracting information associated with how and when to respond to the PCP/AP. This is different than prior solutions where in STA had to receive a request for acknowledgment from the PCP/AP.

The scheduled MU-MIMO acknowledgement signaling device 719 may facilitate that the STA will use the extracted information to determine a schedule that may be embedded or otherwise included in the received frame.

The scheduled MU-MIMO acknowledgement signaling device 719 may facilitate that the frame sent by the PCP/AP (and received by the STA) may be an aggregation of multiple frames that were destined to that STA. For example, an aggregated MPDU may be destined to the STA. The aggregated MPDU may include one or more control frames or portions of the aggregated MPDU that comprise scheduling information. The control frames or portions comprising the scheduling information may be repeated within the aggregated MPDU in order to minimize the situations where the control frame is not received or is lost before it has been received by the STA. Since the STA relies on the scheduling information in order to respond to the PCP/AP at a certain schedule, it is important to increase the chances that the STA will receive the scheduling information comprised in the aggregated MPDU. Number of how many times to repeat the control frame within the aggregated MPDU may be dependent on implementation. Further, the location of where the control frames are within the aggregated MPDU may also be dependent on implementation. For example, a control frame with the scheduling information may be sent at the beginning of the aggregated MPDU and at the end of the aggregated MPDU or it can be sent every other portion of the aggregated MPDU. Although these examples are given for illustration purposes, other patterns for repeating the control frame with the scheduling information, when the control frame is part of the aggregated MPDU.

The scheduled MU-MIMO acknowledgement signaling device 719 may facilitate that the control frame with the scheduling information may be comprised of one or more fields that may help the STA receiving the control frame within the aggregated MPDU to determine how and when to transmit its acknowledgment to the PCP/AP. For example, the control frame may comprise a first offset and a second offset. Where the first offset may indicate to the STA the time offset that it may use after receiving the aggregated MPDU in order to send its acknowledgment. The second offset may be associated with an indication of when the PCP/AP will be sending a subsequent aggregated MPDU that may be destined to the STA.

The scheduled MU-MIMO acknowledgement signaling device 719 may make it possible to use scheduled MU-MIMO acknowledgement flow which can provide up to 758% throughput gain compared to the legacy flow.

It is understood that the above are only a subset of what the scheduled MU-MIMO acknowledgement signaling device 719 may be configured to perform and that other functions included throughout this disclosure may also be performed by the scheduled MU-MIMO acknowledgement signaling device 719.

While the machine-readable medium 722 is illustrated as a single medium, the term "machine-readable medium" may include a single medium or multiple media (e.g., a centralized or distributed database, and/or associated caches and servers) configured to store the one or more instructions 724.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 700 and that cause the machine 700 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device/transceiver 720 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 720 may include one or more physical jacks (e.g., Ethernet, coaxial, or phone jacks) or one or more antennas to connect to the communications network 726. In an example, the network interface device/transceiver 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 700 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

The following examples pertain to further embodiments.

A device of an initiator device, the device comprising storage and processing circuitry coupled to storage, the processing circuitry configured to: determine a block acknowledgment schedule associated with one or more destination devices; cause to send a multi-user multiple-input multiple-output (MU-MIMO) frame including the block acknowledgment schedule; and identify one or more acknowledgment frames received from at least one of the one or more destination devices based on the block acknowledgment schedule.

Example 1 may include the device of example 1 and/or some other example herein, wherein the MU-MIMO frame comprises one or more enhanced directional multi-gigabit (EDMG) aggregated medium access control (MAC) protocol data units (A-MPDUs).

Example 2 may include the device of example 2 and/or some other example herein, wherein a first A-MPDU of the one or more A-MPDUs may be associated with a first destination device of the one or more destination devices.

Example 3 may include the device of example 1 and/or some other example herein, wherein the block acknowledgment schedule may be included in a first sub-frame of the first A-MPDU.

Example 4 may include the device of example 4 and/or some other example herein, wherein the first sub-frame may be repeated within the first A-MPDU.

Example 5 may include the device of example 4 and/or some other example herein, wherein the block acknowledgment schedule comprises a block acknowledgment transmission time (BATT) offset.

Example 6 may include the device of example 1 and/or some other example herein, wherein the BATT offset indicates to a first destination device a time to send a first acknowledgment to the first A-MPDU.

Example 7 may include the device of example 1 and/or some other example herein, wherein the block acknowledgment schedule comprises a next MU-MIMO frame time offset.

Example 8 may include the device of example 1 and/or some other example herein, further comprising a transceiver configured to transmit and receive wireless signals.

Example 9 may include the device of example 9 and/or some other example herein, further comprising one or more antennas coupled to the transceiver.

Example 10 may include a non-transitory computer-readable medium storing computer-executable instructions which when executed by one or more processors of a responding device result in performing operations comprising: identifying a multi-user multiple-input multiple-output (MU-MIMO) frame including a block acknowledgment schedule, wherein the MU-MIMO frame comprises a block acknowledgment schedule; and causing to send a block acknowledgment frame to the initiator device based on the block acknowledgment schedule.

Example 11 may include the non-transitory computer-readable medium of example 11 and/or some other example herein, wherein the MU-MIMO frame comprises one or more enhanced directional multi-gigabit (EDMG) aggregated medium access control (MAC) protocol data units (A-MPDUs).

Example 12 may include the non-transitory computer-readable medium of example 11 and/or some other example herein, wherein the MU-MIMO frame comprises a first A-MPDU associated with the responding device.

Example 13 may include the non-transitory computer-readable medium of example 13 and/or some other example herein, wherein the block acknowledgment schedule may be included in a first sub-frame of the first A-MPDU.

Example 14 may include the non-transitory computer-readable medium of example 14 and/or some other example herein, wherein the first sub-frame may be repeated within the first A-MPDU.

Example 15 may include the non-transitory computer-readable medium of example 11 and/or some other example herein, wherein the block acknowledgment schedule comprises a block acknowledgment transmission time (BATT) offset.

Example 16 may include the non-transitory computer-readable medium of example 16 and/or some other example herein, wherein the BATT offset indicates to a first destination device a time to send a first acknowledgment to the first A-MPDU.

Example 17 may include a method comprising: determining, by one or more processors, a block acknowledgment schedule associated with one or more destination devices; causing to send a multi-user multiple-input multiple-output (MU-MIMO) frame including the block acknowledgment schedule; and identifying one or more acknowledgment frames received from at least one of the one or more destination devices based on the block acknowledgment schedule.

Example 18 may include the method of example 18 and/or some other example herein, wherein the MU-MIMO frame comprises one or more enhanced directional multi-gigabit (EDMG) aggregated medium access control (MAC) protocol data units (A-MPDUs).

Example 19 may include the method of example 19 and/or some other example herein, wherein a first A-MPDU of the one or more A-MPDUs may be associated with a first destination device of the one or more destination devices.

Example 20 may include an apparatus comprising means for: determining a block acknowledgment schedule associated with one or more destination devices; causing to send a multi-user multiple-input multiple-output (MU-MIMO) frame including the block acknowledgment schedule; and identifying one or more acknowledgment frames received from at least one of the one or more destination devices based on the block acknowledgment schedule.

Example 21 may include the apparatus of example 21 and/or some other example herein, wherein the MU-MIMO frame comprises one or more enhanced directional multi-gigabit (EDMG) aggregated medium access control (MAC) protocol data units (A-MPDUs).

Example 22 may include the apparatus of example 22 and/or some other example herein, wherein a first A-MPDU of the one or more A-MPDUs may be associated with a first destination device of the one or more destination devices.

Example 23 may include the apparatus of example 21 and/or some other example herein, wherein the block acknowledgment schedule may be included in a first subframe of the first A-MPDU.

Example 24 may include the apparatus of example 24 and/or some other example herein, wherein the first subframe may be repeated within the first A-MPDU.

Example 25 may include the apparatus of example 24 and/or some other example herein, wherein the block acknowledgment schedule comprises a block acknowledgment transmission time (BATT) offset.

Example 26 may include the apparatus of example 21 and/or some other example herein, wherein the BATT offset indicates to a first destination device a time to send a first acknowledgment to the first A-MPDU.

Example 27 may include one or more non-transitory computer-readable media comprising instructions to cause an electronic device, upon execution of the instructions by one or more processors of the electronic device, to perform one or more elements of a method described in or related to any of examples 1-26, or any other method or process described herein.

Example 28 may include an apparatus comprising logic, modules, and/or circuitry to perform one or more elements of a method described in or related to any of examples 1-26, or any other method or process described herein.

Example 29 may include a method, technique, or process as described in or related to any of examples 1-26, or portions or parts thereof.

Example 30 may include an apparatus comprising: one or more processors and one or more computer readable media comprising instructions that, when executed by the one or more processors, cause the one or more processors to perform the method, techniques, or process as described in or related to any of examples 1-26, or portions thereof.

Example 31 may include a method of communicating in a wireless network as shown and described herein.

Example 32 may include a system for providing wireless communication as shown and described herein.

Example 33 may include a device for providing wireless communication as shown and described herein.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device of an initiator device, the device comprising storage and processing circuitry coupled to storage, the processing circuitry configured to:
generate a block acknowledgment schedule information field associated with one or more destination devices, wherein the block acknowledgment schedule information field comprises:
a block acknowledgment transmission time (BATT) start offset subfield indicative of the beginning of a time slot for the destination device to transmit its block acknowledgment, and
a next physical layer convergence protocol data unit (PPDU) start offset subfield which indicates the moment indicates the offset from the end of the transmitted PPDU to when the initiator device is expected to start transmitting its next PPDU;
cause to send a multi-user multiple-input multiple-output (MU-MIMO) frame to the one or more destination devices, wherein the MU-MIMO frame comprises the block acknowledgment schedule information field, wherein a field of the MU-MIMO frame associated with the block acknowledgment schedule information field starts at bit zero of the block acknowledgment schedule information field; and
identify a first acknowledgment frame received from a first destination device of the one or more destination devices, wherein the first acknowledgment frame is received based on the BATT start offset subfield.

2. The device of claim 1, wherein the BATT start offset subfield indicates a time when the first acknowledgment frame is expected to be transmitted by the first destination device.

3. The device of claim 1, wherein the MU-MIMO frame comprises one or more enhanced directional multi-gigabit (EDMG) aggregated medium access control protocol data units (A-MPDUs).

4. The device of claim 3, wherein a first A-MPDU of the one or more EDMG A-MPDUs is associated with the first destination device of the one or more destination devices.

5. The device of claim 1, wherein the first destination device remains in a doze state until the BATT start offset subfield.

6. The device of claim 1, further comprising a transceiver configured to transmit and receive wireless signals.

7. The device of claim 6, further comprising an antenna coupled to the transceiver to cause to send the MU-MIMO frame.

8. A non-transitory computer-readable medium storing computer-executable instructions which when executed by one or more processors result in performing operations comprising:
generating a block acknowledgment schedule information field associated with one or more destination devices, wherein the block acknowledgment schedule information field comprises:
a block acknowledgment transmission time (BATT) start offset subfield indicative of the beginning of a time slot for the destination device to transmit its block acknowledgment, and
a next physical layer convergence protocol data unit (PPDU) start offset subfield which indicates the moment indicates the offset from the end of the transmitted PPDU to when the initiator device is expected to start transmitting its next PPDU;
causing to send a multi-user multiple-input multiple-output (MU-MIMO) frame to the one or more destination devices, wherein the MU-MIMO frame comprises the block acknowledgment schedule information field, wherein a field of the MU-MIMO frame associated with the block acknowledgment schedule information field starts at bit zero of the block acknowledgment schedule information field; and
identifying a first acknowledgment frame received from a first destination device of the one or more destination devices, wherein the first acknowledgment frame is received based on the BATT start offset subfield.

9. The non-transitory computer-readable medium of claim 8, wherein the BATT start offset subfield indicates a time when the first acknowledgment frame is expected to be transmitted by the first destination device.

10. The non-transitory computer-readable medium of claim 8, wherein the MU-MIMO frame comprises one or more enhanced directional multi-gigabit (EDMG) aggregated medium access control protocol data units (A-MPDUs).

11. The non-transitory computer-readable medium of claim 10, wherein a first A-MPDU of the one or more EDMG A-MPDUs is associated with the first destination device of the one or more destination devices.

12. The non-transitory computer-readable medium of claim 8, wherein the first destination device remains in a doze state until the BATT start offset subfield.

13. A method comprising:
generating, by one or more processors, a block acknowledgment schedule information field associated with one or more destination devices, wherein the block acknowledgment schedule information field comprises:
a block acknowledgment transmission time (BATT) start offset subfield indicative of the beginning of a time slot for the destination device to transmit its block acknowledgment, and
a next physical layer convergence protocol data unit (PPDU) start offset subfield which indicates the moment indicates the offset from the end of the transmitted PPDU to when the initiator device is expected to start transmitting its next PPDU;
causing to send a multi-user multiple-input multiple-output (MU-MIMO) frame to the one or more destination devices, wherein the MU-MIMO frame comprises the block acknowledgment schedule information field, wherein a field of the MU-MIMO frame associated with the block acknowledgment schedule information field starts at bit zero of the block acknowledgment schedule information field; and identifying a first acknowledgment frame received from a first destination device of the one or more destination devices, wherein the first acknowledgment frame is received based on the BATT start offset subfield.

14. The method of claim 13, wherein the BATT start offset subfield indicates a time when the first acknowledgment frame is expected to be transmitted by the first destination device.

\* \* \* \* \*